US009297414B2

(12) United States Patent
Kullin et al.

(10) Patent No.: US 9,297,414 B2
(45) Date of Patent: Mar. 29, 2016

(54) BEARING UNIT FOR FLUID MACHINERY APPLICATION

(71) Applicants: Jonas Kullin, Landvetter (SE); Juergen Reichert, Donnersdorf (DE); Hans Wendeberg, Västra Frölunda (SE)

(72) Inventors: Jonas Kullin, Landvetter (SE); Juergen Reichert, Donnersdorf (DE); Hans Wendeberg, Västra Frölunda (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/535,420

(22) Filed: Nov. 7, 2014

(65) Prior Publication Data

US 2015/0139583 A1    May 21, 2015

(30) Foreign Application Priority Data

Nov. 7, 2013    (SE) ...................................... 1300694

(51) Int. Cl.

| | |
|---|---|
| *F16C 23/08* | (2006.01) |
| *F16C 19/38* | (2006.01) |
| *F16C 19/28* | (2006.01) |
| *F16C 33/36* | (2006.01) |
| *F16C 19/54* | (2006.01) |

(52) U.S. Cl.
CPC ............... *F16C 23/082* (2013.01); *F16C 19/38* (2013.01); *F16C 23/086* (2013.01); *F16C 19/543* (2013.01)

(58) Field of Classification Search
CPC ........ F16C 19/50; F16C 19/38; F16C 19/497; F16C 33/585; F16C 33/60; F16C 43/06; F16C 23/086; F16C 2240/34; F05B 2250/241; F03D 11/008; H02K 7/1838; H02K 7/083

USPC ......... 384/548, 558, 564–565, 568, 570–571; 416/170 R, 174

See application file for complete search history.

(56) References Cited

U.S. PATENT DOCUMENTS

| | | | | | |
|---|---|---|---|---|---|
| 2,418,322 | A | * | 4/1947 | Spicacci ........................ | 384/571 |
| 2,554,957 | A | * | 5/1951 | Riblet ........................... | 384/571 |
| 4,784,438 | A | * | 11/1988 | Fikse ............................ | 299/110 |
| 5,462,367 | A | * | 10/1995 | Davidson et al. ............. | 384/459 |

(Continued)

FOREIGN PATENT DOCUMENTS

| | | | | |
|---|---|---|---|---|
| DE | 3004672 | A1 * | 8/1981 | ............. F16C 19/38 |
| DE | 19916580 | A1 | 10/1999 | |

(Continued)

*Primary Examiner* — Marcus Charles
(74) *Attorney, Agent, or Firm* — Bryan Peckjian; SKF USA Inc. Patent Dept.

(57) ABSTRACT

A bearing unit for a fluid machinery application having a double-row bearing, the double-row bearing comprising: a first angular self-aligning contact bearing arranged next to a second angular self-aligning contact bearing for locating and rotatably support a shaft; each angular self-aligning contact bearing having a respective set of rolling elements formed of rollers arranged in a row and interposed between an associated curved inner raceway and a curved outer raceway. Each roller is a symmetrical cylindrically shaped roller having a curved raceway-contacting surface engaging with the curved inner and outer raceways. Each roller is inclined in relation to the axial direction of the shaft by a respective first or second contact angle. The rollers are arranged to cooperate with the associated curved inner and raceways for supporting an axial force and a radial force. Examples of fluid machinery applications include: wind turbine, water turbine or propulsion turbine arrangements.

15 Claims, 3 Drawing Sheets

(56) References Cited

U.S. PATENT DOCUMENTS

| | | | |
|---|---|---|---|
| 6,814,494 B2 * | 11/2004 | Borowski et al. | 384/568 |
| 7,771,308 B2 * | 8/2010 | Willie | 475/347 |
| 7,922,396 B2 * | 4/2011 | Mori | 384/558 |
| 8,178,988 B2 * | 5/2012 | Numajiri | 290/44 |
| 8,262,293 B2 * | 9/2012 | Bohr et al. | 384/568 |
| 8,298,115 B2 * | 10/2012 | Ciszak et al. | 475/348 |
| 8,608,444 B2 * | 12/2013 | Zeidlhack | 384/619 |
| 2012/0055024 A1 | 3/2012 | Kawano et al. | |
| 2012/0121420 A1 * | 5/2012 | Yuki et al. | 416/174 |
| 2012/0243999 A1 * | 9/2012 | Steffensen | 416/170 R |

FOREIGN PATENT DOCUMENTS

| | | | | |
|---|---|---|---|---|
| DE | 102008022935 A1 * | 11/2009 | | F16C 33/46 |
| DE | 102008046623 A1 * | 3/2010 | | F16C 19/38 |
| DE | 112008002385 T5 | 7/2010 | | |
| EP | 1160469 A2 | 5/2001 | | |
| EP | 1160469 A2 | 12/2001 | | |
| GB | 2112085 A | 7/1983 | | |
| WO | 2013162436 A1 | 10/2013 | | |

\* cited by examiner

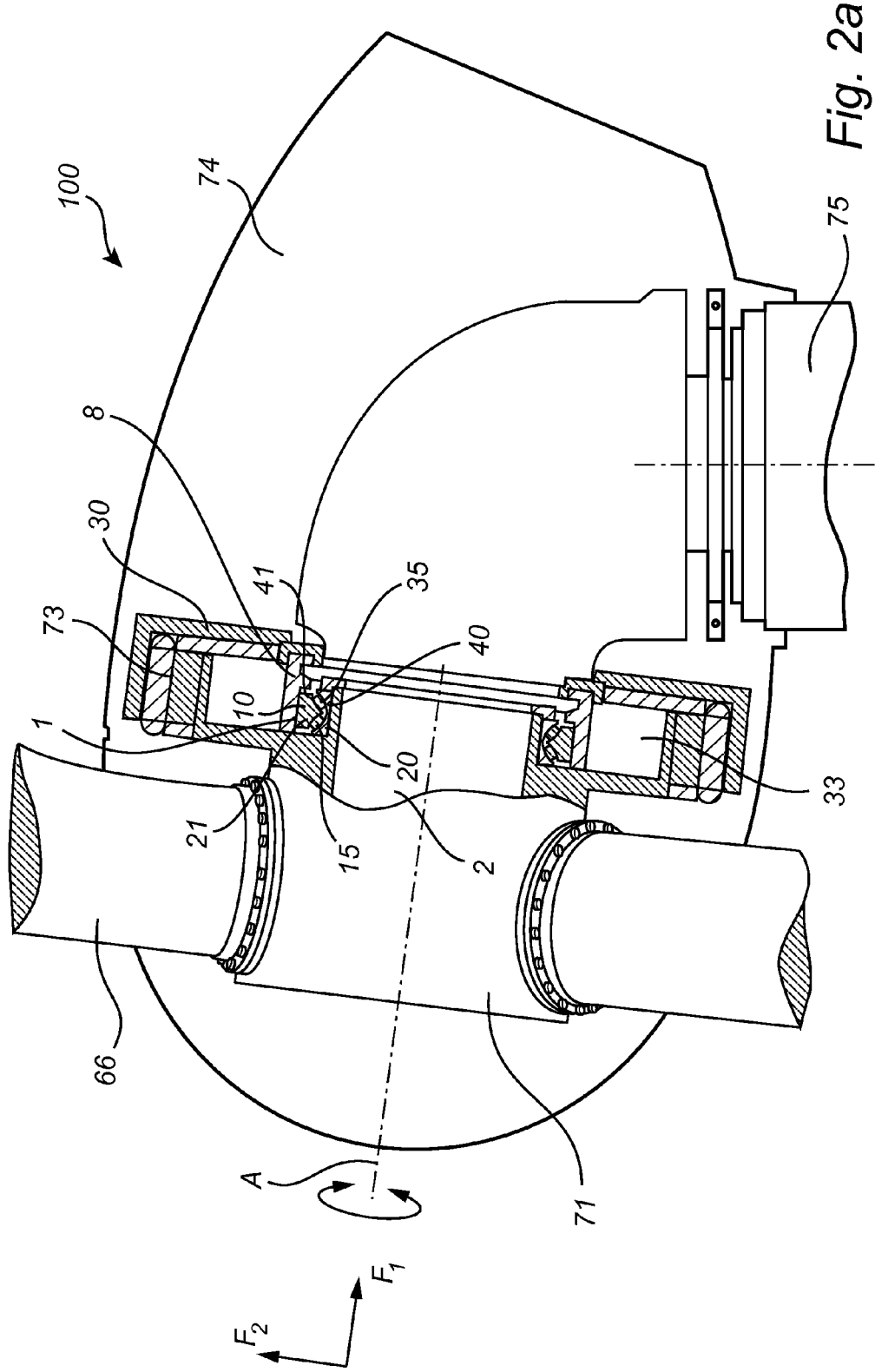

BEARING UNIT FOR FLUID MACHINERY APPLICATION

CROSS REFERENCE TO RELATED APPLICATION

This is a National Stage application claiming the benefit of Sweden Patent Application Number 1300694-5 filed on 7 Nov. 2013 (Jul. 11, 2013), which is incorporated herein by reference in its entirety.

FIELD OF THE INVENTION

The present invention pertains to a bearing unit for a fluid machinery application, such as a wind turbine arrangement, a water turbine arrangement or a propulsion turbine arrangement. More specifically, the bearing unit includes a double-row bearing which is capable of supporting axial loads, radial loads as well as overturning moments and restricting axial movement of a shaft, such as a rotor shaft of the fluid machinery application.

Moreover, the present invention pertains to a fluid machinery application, such as a wind turbine arrangement, a water turbine arrangement or a propulsion turbine arrangement, comprising a bearing unit.

BACKGROUND ART

In the field of fluid machinery applications, there is an increasing demand for improving the robustness and operation of the components making up the fluid machinery system. In the present context, the term "fluid machinery application" refers to any arrangement that can extract energy from a continuously moving stream of fluid (liquid or gas). Since the fluid machinery application transfers the energy from the fluid to a rotor, and typically is provided with a rotating component through which the fluid passes, the fluid machinery application should be capable of supporting a radial force and a considerable large axial force, as seen in the direction of the rotor shaft of the fluid machinery application. The energy from the fluid streams is converted into mechanical energy of a rotating shaft by one or several turbines. In this type of applications, the rotating component typically refers to the rotor, which is provided with a set of vanes or blades.

One example of a fluid machinery application is a wind turbine arrangement. Other examples of fluid machinery applications are water turbine arrangements and propulsion turbine arrangements. Depending upon the purpose of the fluid machinery application, the working fluid may be either liquid or gas.

In order to support the rotational movement of the rotor, this type of arrangements is typically provided with one or several bearings. Due to the large dimensions and weight of wind turbines, the load bearing capabilities and performance of the bearing(s) supporting the rotor shaft and the wind turbine blades is of high importance. As a consequence, the bearing must be aligned and positioned in a correct manner in order to avoid unnecessary wear of the components making up the bearing.

Typically, for a wind turbine of horizontal, or near horizontal, rotor shaft type, the bearing arrangement must support both axial and radial loads, wherein the axial loads refers to axial loads transferred from the turbine blades during operation as well as axial loads arising from the weight of the rotor shaft and turbine blade arrangement, which is often mounted with a tilted angle in relation to the horizontal plane in order to reduce the risk of collision between the turbine blades and the wind turbine tower.

Moreover, the weight and size of the components as well as the location of the rotor arrangement in tower-like structures increase the cost for manufacturing, mounting, and servicing of the wind turbines. In particular, the attachment of load bearing rolling bearings to the rotor shaft and to support structures is cumbersome and costly, typically involving heating techniques of members, such as the inner ring of a rolling bearing to be mounted, in order to provide suitable attachment and pre-stressing, while maintaining a high level of precision to ensure a correct alignment and orientation of the rolling bearing in relation to the shaft and/or support structure. As a result, the mounting process is complicated and time-consuming, and often requires auxiliary equipment for heating and alignment control measurements. Also, in the hitherto known solutions, the dismounting of the load bearing rolling bearings from the rotor shaft or from the support structures is cumbersome and time-consuming. In other words, mounting and dismounting of the rotor arrangement and the bearing typically require advanced application engineering, while posing high quality requirements on the surrounding parts of the system.

Moreover, in order to ensure that the bearing is capable of being operated under extreme conditions without extensive maintenance, relevant parts of the bearing, such as the raceways, may have to undergo a heat treatment process, such as for instance a hardening process in order to withstand high contact stresses and fatigue damages.

One example of a bearing commonly used in fluid machinery applications, such as wind turbines arrangements, is a spherical roller bearing. A spherical roller bearing is provided with a spherical geometry allowing for self-alignment of the shaft during operation (i.e. upon rotation of the shaft). By self-alignment, the angular alignment of the rotational axis of the rotating shaft may change in relation to the bearing such that an angular movement of the shaft in relation to the housing is permitted. Another example of a bearing commonly used in fluid machinery applications, such as wind turbines arrangements, is a tapered roller bearing. A tapered roller bearing (TRB) is provided with conically shaped rollers with inclined raceways. Typically, a tapered roller bearing cannot misalign. In addition, tapered roller bearings may require high preload and high accuracy on its components. Since there is a risk of generating excessive contact stresses during operation of the tapered roller bearing, there is often a prerequisite to perform advanced FEM calculations in order to provide an appropriately dimensioned bearing. One area of interest when designing tapered roller bearings is the design of the housing seats, which should be as accurate as possible to ensure that no misalignment can occur during operation of the bearing.

During operation of the rotor shaft arrangement, the axial movement of the rotating shaft must further be restricted by the roller bearing in order to provide a smooth operation and to reduce wear and damage to connected and/or surrounding equipment, such as a gear box etc. Any excessive axial play may considerably reduce the life time of the application arrangement.

Moreover, in order to provide an appropriate and a durable axial locating function of the spherical roller bearing, the size and the radial dimension of the geometry of the spherical roller bearing may be increased. By increasing the size and the radial dimension, the contact angles between the rollers and raceway in relation to the axis of the rotating shaft are increased. With respect to tapered roller bearings, the inner geometry of TRBs is designed according to radial and axial loads. The contact angles are chosen according to the load requirements. In contrast, for standard SRBs, the contact angle in ISO-series dependent is almost fixed. Further, the ISO-series dependent contact angle is selected according to the axial load requirements. This may lead to an over-dimensioning for radial loads.

Accordingly, hitherto known bearing solutions for fluid machinery applications involving an axially locating roller bearing are considered to suffer from overdesigning in relation to e.g. radial load bearing capacity. Similarly, many of those bearings are non-compact including large bearing designs in order to provide a sufficient axial load bearing capacity. In this manner, this type of bearing is considered to occupy valuable space in the fluid machinery arrangement. Furthermore, larger bearings are more expensive to produce due to high material costs, while the high bearing mass may have a negative impact on the operational efficiency by e.g. increasing the rotational inertia of the arrangement.

It therefore remains a need for a simple bearing arrangement which requires less accuracy requirements of the surrounding parts and reduced application engineering efforts, while maintaining a high capacity to withstand radial and axial loads from the rotor shaft of the fluid machinery application.

SUMMARY OF THE INVENTION

In view of the above-mentioned and other drawbacks of the prior art, a general object of the present invention is to provide an improved and robust bearing unit for a fluid machinery application as well as a fluid machinery application including such bearing unit.

These and other objects are met by the subject matters provided in the independent claims. Preferred embodiments of the invention are presented in the dependent claims.

According to a first aspect of the present invention, there is provided a bearing unit for a fluid machinery application having a double-row bearing. The double-row bearing comprises a first angular self-aligning contact bearing arranged next to a second angular self-aligning contact bearing for locating and rotatably support a shaft. That is, for locating the shaft against movement in an axial and a radial direction as well as against movement resulting from overturning movements. The first angular self-aligning contact bearing has a first set of rolling elements formed of rollers arranged in a first row and interposed between a first curved inner raceway and a first curved outer raceway, wherein each roller is a symmetrical cylindrically shaped roller having a curved raceway-contacting surface being engageable with the first curved inner raceway and the first curved outer raceway. Moreover, each roller of the first angular self-aligning contact bearing is inclined in relation to the axial direction of the shaft by a first contact angle $\alpha_1$. Thereby the rollers are arranged to cooperate with the first curved inner raceway and the first curved outer raceway for supporting an axial force $F_1$ and a radial force $F_2$. Analogously, the second angular self-aligning contact bearing has a second set of rolling elements formed of rollers arranged in a second row and interposed between a second curved inner raceway and a second curved outer raceway, wherein each roller is a symmetrical cylindrically shaped roller having a curved raceway-contacting surface being engageable with the second curved inner raceway and the second curved outer raceway. Moreover, each roller of the second angular self-aligning contact bearing is inclined in relation to the axial direction of the shaft by a second contact angle $\alpha_2$. Thereby the rollers of the second set of rolling elements are arranged to cooperate with the second curved inner raceway and the second curved outer raceway for supporting the axial force $F_1$ and the radial force $F_2$. In addition, each roller of the first angular self-aligning contact bearing is inclined in relation to each roller of the second angular self-aligning contact bearing such that a first pressure centre of the first angular self-aligning contact bearing is displaced from a second pressure centre of the second angular self-aligning contact bearing. As discussed below, one function of this provision is that the bearing unit of the present invention can accommodate local internal misalignments, such as wringing of the rings, which in turn ensures that there will not be any excessive edge contact stresses.

By the principle of the present invention, it becomes possible to provide an improved and more compact fluid machinery application, e.g. a wind turbine arrangement, a water turbine arrangement or a propulsion turbine arrangement. The fluid machinery application is compact in the sense that the bearing function can be arranged within one single bearing unit. More specifically, by the provision that the each roller of the first angular self-aligning contact bearing and each roller of the second angular self-aligning contact bearing are inclined in relation to the axial direction and that the first pressure centre of the first angular self-aligning contact bearing is displaced from the second pressure centre of the second angular self-aligning contact bearing, it becomes possible to keep the size of the bearing unit to a minimum without compromising the function of the bearing unit and/or the fluid machinery application. This is realized by providing a double row roller bearing having pronounced tilted contact angles, i.e. inclined contact angles of the first angular self-aligning contact bearing and the second angular self-aligning contact bearing. In other words, the present invention provides a robust yet compact bearing unit.

In addition, the bearing unit of the present invention allows local wringing of the bearing cross section without edge stress. Hence, it is considered more flexible and more tolerant towards geometrical imperfections of the fluid machinery application than conventional bearing arrangements.

Accordingly, the bearing unit is typically arranged for supporting a shaft of the fluid machinery application.

Moreover, by tilting the contact angles, the bearing unit is capable of maintaining the axial load bearing capacity while the axial width and radial extension of the bearing unit may be decreased. That is, increased contact angles lead to the possibility of accommodating a larger axial force. In addition, larger contact angles reduce axial clearance for a given radial clearance.

In this manner, it becomes possible to reduce the weight of the nacelle weight of the assembled fluid machinery application, e.g. an assembled wind turbine arrangement. For example, by the provision that both of the angular self-aligning contact bearings having an inclined contact angle, respectively, the normal direction of the outer raceway, or the entire roller contacting surface of the outer raceway, is angled in relation to the radial direction of the rotor shaft.

It is to be noted that an angular self-aligning contact bearing according to any one of the described configurations of the first angular self-aligning contact bearing and second angular self-aligning contact bearing may sometimes be denoted as a SAT (self-aligning torus) bearing.

Another advantage of the configuration of the first angular self-aligning contact bearing is that the axial movement of the shaft can be restricted in relation to the first angular self-aligning contact bearing. Analogously, another advantage of the configuration of the second angular self-aligning contact bearing is that the axial movement of the shaft can be restricted in relation to the second angular self-aligning contact bearing.

Accordingly, by the configuration of the double row bearing, it becomes possible to locate a rotor shaft of a fluid machinery application against movement in the axial direction A and the radial direction R. In addition, due to the configuration of the bearing unit, it is particularly suitable for supporting a rotational movement (i.e. a rotational torque) of the fluid machinery application, i.e. overturning movements of the shaft.

By the term "self-aligning" means that angular displacement (misalignment) between an outer ring and an inner ring of the bearing can be accommodated without causing critical negative effects on the performance of the bearing. Hence, the term "self-aligning" means that the inner ring and the outer ring can be angularly displaced in relation to the rotation axis of the bearing. Accordingly, the bearing unit is configured to accommodate local misalignment, at least on a microscopic level, between the rotor shaft and the housing without increasing friction or reducing the service life of the bearing unit. The self-aligning function of the present invention is provided by utilizing two angular self-aligning contact bearings, each one having curved contacting surfaces between the rollers and the inner and outer raceways, which allows for compensation of angular misalignment of the rotor shaft in relation to the housing structure of the fluid machinery application. It should therefore be readily appreciated that the configuration of two angular self-aligning contact bearings provides the possibility to accommodate local or internal misalignments of the bearing. Hence, the alignment requirements of the housing structure of the bearing unit when being mounted to and fixated in relation to a nacelle framing may be considerable reduced. For example, reduced alignment requirements allow for simplified mounting, dismounting and replacement of individual components of the rotor shaft arrangement.

Further, it is to be noted that by the provision of using the configuration of two angular self-aligning contact bearings according to the first aspect as mentioned above, and in particular by means of the internal spherical geometry, the present invention provides a bearing unit which does not generate excessive contacts stresses in the bearing unit.

The self-aligning function further allows for some misalignment of the first angular self-aligning contact bearing and/or the second angular self-aligning contact bearing, at least on a microscopic level, if the rotor shaft is subjected to bending, as explained in more detail hereinafter.

By the self-aligning capability of the double-row bearing, the weight of the rotor shaft arrangement may further be reduced since the stiffness, and thereby the weight, of the shaft may be reduced. This is achieved by the configuration of two angular self-aligning contact bearings due to that bending deflections of the rotor shaft giving rise to angular misalignment at the support point may be compensated, at least on a microscopic level. Also bending deflections of the nacelle framing may be compensated by the configuration of two angular self-aligning contact bearings.

By the provision that the first angular self-aligning contact bearing is being arranged next to the second angular self-aligning contact bearing, they are located within the same bearing unit and capable of cooperating to axially locate the rotor shaft in relation to the housing structures of the fluid machinery application. In this context of the present invention, the first angular self-aligning contact bearing typically is arranged in direct contact with the second angular self-aligning contact bearing. Alternatively, the first angular self-aligning contact bearing may be indirectly in contact with the second angular self-aligning contact bearing. By having the first angular self-aligning contact bearing arranged next to the second angular self-aligning contact bearing and located within the same housing, it becomes possible to provide a simple, yet reliable and robust, bearing solution for a fluid machinery application. More specifically, it becomes possible to provide a bearing solution which merely requires one attachment point on the rotor shaft. In this manner, the mounting of the bearing is further simplified. Hence, the present invention is superior over existing two-point suspension bearing arrangements that typically require two spaced-apart attachment/supporting points.

Hence, in one example embodiment, the bearing unit may be a single bearing unit. This is different than a bearing arrangement using two separate bearings located next to each other.

If the bearing unit is provided with outer ring(s) and inner ring(s), the bearing unit can be provided with a mounting flange having bores for mounting screw/bolts on either the outer ring(s) and/or the inner ring(s).

As mentioned above, each one of the first and second angular self-aligning contact bearings are provided with symmetrical cylindrically shaped roller. In this context of the present invention, the term "symmetrical" means that each roller in the set of the rolling elements of the first angular self-aligning contact bearing and/or the second angular self-aligning contact bearing has a symmetrical shape, wherein the axial ends of the roller are equal, or symmetric, with each other, i.e. having similar dimensions, such as similar radial dimensions. In more detail, each roller may comprise a first axis of symmetry which coincides with the rotational axis of the roller, and a second axis of symmetry which is orthogonal to the first axis of symmetry. In other words, each roller may have a shape having at least two separate orthogonal axes of symmetry.

The symmetrical cylindrically shaped rollers and the corresponding raceways of the first angular self-aligning contact bearing and the second angular self-aligning contact bearing allow for reliable operation as wells as cost and time efficient manufacturing. Furthermore, the symmetrical cylindrically shaped rollers are maintained in a functional reliable alignment in relation to the inner and outer raceways in the axial direction during operation due to the adapted curved shaped of the rollers and raceways. Hence, there might not be any need for guiding flanges or guiding projections from any of the inner or outer raceways in order to ensure that the rollers are maintained in a correct interposed position between the inner and outer rings.

The absence of a guiding flange or guide ring is another distinguishing feature of the present invention in view of a conventional tapered roller bearing. This difference in features between the present invention and a conventional tapered roller bearing, may be positively expressed in that the first angular self-aligning contact bearing is free from a guiding flange. Analogously, the second angular self-aligning contact bearing is free from a guiding flange. Since neither the first angular self-aligning contact bearing nor the second angular self-aligning contact bearing does not require a guiding flange, the design of the bearing unit is further simplified compared to conventional bearing solutions, which contributes to reduced the manufacturing costs of present invention. The geometry of the roller elements and the inner and outer raceways further reduces the static and dynamic friction of the bearing allowing for more efficient starting and output from e.g. a wind turbine arrangement during operation.

The symmetrical cylindrically shaped rollers self-adjust, providing an even load distribution along the roller length. This provides very high load carrying capacity under all load combinations.

The first set of rollers and/or the second set of rollers may typically include a plurality of roller elements, e.g. 30-60 rollers, or even more than 100, although fewer of additional rollers could be used dependent on the required function, load capacity and/or size of the bearing unit.

It should be readily understood that each one of the first and second angular self-aligning contact bearings are provided with an internal clearance which is set by the distance between the inner curved raceways (or the two inner rings). The clearance is split between the two contact bearings and can range from negative (preload) via zero to positive. Typically, the rollers and raceways are manufactured as standard with normal internal clearance.

In summary, by the present invention, there is provided a bearing unit having an optimized internal geometry, while conferring maximum radial and axial load carrying capacity as well as overturning moment carrying capacity. The present invention is further robust in the sense that the bearing unit is less sensitive to misalignment caused by shaft or housing deflections as a result of heavy loads. Since the first angular self-aligning contact bearing and the second angular self-aligning contact bearing are non-separable and ready to be installed in a fluid machinery application, the mounting of the bearing unit is simplified, enabling a more efficient and compact fluid machine designs.

In the context of the present invention, the first contact angle $\alpha_1$ and/or second contact angle $\alpha_2$ may be defined as the angle between a straight line normal to a centre axis of a roller and the centre axis of the rotor shaft (i.e. a straight line parallel to the plane of rotation). The straight line may also represent the line along which the resulting load is transmitted via the roller element from one raceway to another raceway.

Accordingly, the first pressure centre $P_1$ of the first angular self-aligning contact bearing may be defined by a normal from the raceway to the centre axis of the rotor shaft. Analogously, the second pressure centre $P_2$ of the second angular self-aligning contact bearing may be defined by a normal from the raceway to the centre axis of the rotor shaft.

Accordingly, by the provision that the first pressure centre $P_1$ of the first angular self-aligning contact bearing is displaced from the second pressure centre $P_2$ of the second angular self-aligning contact bearing means that there is no intersection between the normal to the first raceway of the first contact bearing and the normal to the second raceway of the second contact bearing along the centre axis of the rotor shaft.

The first contact angle $\alpha_1$ of the first angular self-aligning contact bearing and/or the second contact angle $\alpha_2$ of the second angular self-aligning contact bearing may also be defined as the angle between the rotational axis of the symmetrical rollers and the centre axis of the rotor shaft.

That is, the first contact angle $\alpha_1$ between each roller and any one of the first curved inner raceway and the first curved outer raceway is inclined in relation to the axial direction of the shaft. Analogously, the second contact angle $\alpha_2$ between each roller of the second set of rolling elements and any one of the second curved inner raceway and the second curved outer raceway is inclined in relation to the axial direction of the shaft.

The value of the first contact angle $\alpha_1$ of the first angular self-aligning contact bearing should be appropriately selected. However, in order to provide a tilted or an inclined first angular self-aligning contact bearing, the angle cannot be equal to 0 degrees or 90 degrees. As an example, the value of the first contact angle $\alpha_1$ may be between 10-60 degrees. Still preferably, the value of the first contact angle $\alpha_1$ may be between 20-50 degrees. Still preferably, the value of the first contact angle $\alpha_1$ may be between 35-45 degrees. In one example embodiment, the value of the first contact angle $\alpha_1$ is approximately 45 degrees.

Analogously, the value of the second contact angle $\alpha_2$ of the second angular self-aligning contact bearing should be appropriately selected. However, in order to provide a tilted or an inclined second angular self-aligning contact bearing, the angle cannot be equal to 0 degrees or 90 degrees. As an example, the value of the second contact angle $\alpha_2$ may be between 10-60 degrees. Still preferably, the value of the second contact angle $\alpha_2$ may be between 20-50 degrees. Still preferably, the value of the second contact angle $\alpha_2$ may be between 35-45 degrees. In one example embodiment, the value of the second contact angle $\alpha_2$ is approximately 45 degrees.

In addition, or alternatively, the value of the first contact angle $\alpha_1$ may be distinct from the value of the second contact angle $\alpha_2$. In this manner, the bearing unit may be provided with asymmetric rows, i.e. the inclination of the first row of the first set of rollers is different to the inclination of the second row of the second set of rollers. One advantage with this configuration is that the size of the bearing unit can be adjusted to meet the demands of a certain wind turbine arrangement. In other words, the size of the bearing unit can kept to a minimum.

In one example embodiment, the value of the first contact angle $\alpha_1$ may be equal to the value of the second contact angle $\alpha_2$.

Alternatively, the value of the first contact angle $\alpha_1$ may be smaller than the value of the second contact angle $\alpha_2$.

Alternatively, the value of the first contact angle $\alpha_1$ may be larger than the value of the second contact angle $\alpha_2$.

In one example embodiment, the first curved inner raceway may be arranged in a first inner ring of the first angular self-aligning contact bearing. In addition, or alternatively, the first curved outer raceway may be arranged in a first outer ring of the first angular self-aligning contact bearing. The outer ring may encircle the inner ring, whereby the set of rolling elements formed of the rollers is arranged in an intermediate configuration between the first inner ring and the first outer ring.

Analogously, the second curved inner raceway may be arranged in a second inner ring of the second angular self-aligning contact bearing. In addition, or alternatively, the second curved outer raceway may be arranged in a second outer ring of the second angular self-aligning contact bearing. The second outer ring may encircle the second inner ring, whereby the set of rolling elements formed of the rollers is arranged in an intermediate configuration between the second inner ring and the second outer ring.

Any one of the first inner ring and the second inner ring may be provided in the form of a flangeless inner ring.

In another example embodiment, the first curved inner raceway may be arranged in a first inner ring and the second curved inner raceway may be arranged in a second inner ring, while the first curved outer raceway and the second curved outer raceway may be arranged in one single outer ring. Alternatively, the first curved outer raceway may be arranged in a first outer ring and the second curved inner raceway may be arranged in a second inner ring, while the first curved inner raceway and the second curved inner raceway may be arranged in one single inner ring.

According to one exemplary embodiment, the curved outer raceway of the first angular self-aligning contact bearing and the curved outer raceway of the second angular self-aligning contact bearing may facing away from each other, as seen in the axial direction A. In other words, the pair of the first angular self-aligning contact bearing and the second angular self-aligning contact bearing is mounted in a so-called back-to-back arrangement, also sometimes denoted O-arrangement. According to one exemplary embodiment, the curved outer raceway of the first angular self-aligning contact bearing may facing the curved outer raceway of the second angular self-aligning contact bearing, as seen in the axial direction A. In other words, the pair of the first angular self-aligning contact bearing and the second angular self-aligning contact bearing here is mounted in a so-called face-to-face arrangement, also sometimes denoted X-arrangement. The first angular self-aligning contact bearing and the second angular self-aligning contact bearing may be contained in a bearing housing.

In addition, or alternatively, the outer ring of the bearing unit may be provided with one or several lubrication holes so as to facilitate efficient bearing lubrication.

Typically, but not necessarily, the first set of the rollers may be contained in a window-type cage. In addition, or alternatively, the second set of the rollers may be contained in another window-type cage. The window-type cage may be centered on the flangeless inner ring via a floating guide ring between the two rows of rollers. The window-type cage can be made of machined brass or steel cage. Steel and brass cages are strong as well as tolerant to high temperatures and all lubricants.

In addition, or alternatively, the self-aligning bearing may include a bearing seal arranged in the bearing axially outside the race tracks and designed to bridge the space between the inner ring and the outer ring. Besides that the seal prevent contaminants from entering the raceways, the seal further has the function of retaining lubricant in the available space between the raceways and the rolling elements.

The present invention is particularly suitable for fluid machinery application such as wind turbine arrangement, water turbine arrangement or a propulsion turbine arrangement. It should be readily appreciated that the direction of the radial load and the axial load may vary depending on whether the fluid machinery application is a wind turbine arrangement, water turbine arrangement or a propulsion turbine arrangement. Likewise, for a propulsion turbine arrangement, the direction of the radial load and the axial load may vary depending on whether a motor, being operatively connected to the propeller shaft, is operated in forward or reverse. In any case, and regardless of the direction of the loads, the bearing unit is capable of supporting axial and radial loads as well as overturning moments while the fluid machinery application is in operation.

According to a second aspect of the present invention, there is provided a fluid machinery application, such as wind turbine arrangement, water turbine arrangement or a propulsion turbine arrangement, comprising a bearing unit according to any one of the aspects and/or example embodiments as mentioned above.

Effects and features of this second aspect of the present invention are largely analogous to those described above in relation to the first aspect of the present invention.

As an example, the bearing unit may be arranged for supporting radial forces and axial forces of a shaft of the fluid machinery application. Typically, the shaft is provided in the form of a rotor shaft, which is operatively connected to a set of turbine blades, whereby the rotor shaft is capable of supporting the rotational movement of the turbine blades. In an embodiment, the inner ring(s) of the bearing unit of the fluid machinery application is/are rotating whilst the outer ring(s) is/are stationary in respect of the fluid machinery application. In another embodiment, the outer ring(s) of the bearing unit of the fluid machinery application is/are rotating whilst the inner ring(s) is/are stationary in respect of the fluid machinery application.

According to a third aspect of the present invention, there is provided a use of the bearing unit, according to any one of the aspects and/or example embodiments as mentioned above, in a fluid machinery application. The bearing unit is configured for supporting axial and radial loads as well as overturning moments of the shaft in the fluid machinery application.

Effects and features of this third aspect of the present invention are largely analogous to those described above in relation to the first aspect and second aspect of the present invention.

The fluid machinery application may be of a horizontal or nearly horizontal type. Besides including a rotor shaft operatively connected to a set of turbine blades, the fluid machinery application may comprise a non-rotating support structure for supporting the rotor shaft. The support structure may be arranged to be mounted to a turbine nacelle framing. In this context of the present invention, the bearing unit may be arranged to support the rotor shaft in relation to the support structure at a first support point.

As mentioned above, the bearing unit may be provided with a first inner ring, a first outer ring, and a set of first rolling elements arranged in an intermediate configuration between the inner and outer rings. In addition, the bearing unit may be provided with a second inner ring, a second outer ring, and a set of second rolling elements arranged in an intermediate configuration between the second inner and second outer rings. If the fluid machinery application is provided with a first inner ring and a second inner ring, the rotor shaft arrangement may further comprise an attachment portion for securing the first inner ring and the second inner ring to the rotor shaft.

As an example, the attachment portion may comprise a radially outer support surface for an inner support surface of any of the first and the second inner rings.

In addition, or alternatively, the radially outer support surface of the attachment portion may be expanded radially outwards for securing any of the inner rings by an expansion member being driven into the attachment portion. In this manner, it becomes possible to provide an improved and more efficient mounting of the rotor shaft arrangement. More specifically, by securing any one of the inner rings of the bearing unit to an attachment portion of e.g. a rotor shaft or support structure by expanding the attachment portion radially outwards with an expansion member, it becomes possible to provide a pressure fit between the attachment portion and any one of the inner rings. Thereby, the inner rings may advantageously be arranged in the correct position and alignment in relation to the attachment portion before the attachment portion is expanded. Hence, mounting may be considerably facilitated by separating the positioning and alignment step from the attachment step during the mounting process.

As an example, the expansion of the attachment portion in the radial outward direction provided by the expansion member is between 1 and 2000 microns, or between 5 and 500 microns.

According to one example embodiment, the attachment portion may be formed by the rotor shaft. Thereby, the inner rings of the bearing unit are securely attached to the rotor shaft being supported by a non-rotating surrounding support structure, wherein the attachment portion forms part of the rotor shaft.

According to another example embodiment, the attachment portion may be formed by the support structure. Thereby, the inner rings of the bearing unit are securely attached to the support structure, such as a radially inner non-rotating support structure of a radially outer circumferential hollow rotor shaft or hub, wherein the attachment portion forms part of the support structure.

According to a further example embodiment of the present invention, it further relates to a wind turbine arrangement comprising the wind turbine rotor shaft arrangement and a nacelle framing, wherein the rotor shaft is supported by and mounted to the nacelle framing via the first housing structures.

Further features of, and advantages with, the present invention will become apparent when studying the appended claims and the following description. The skilled person may realize that different features of the present invention may be combined to create embodiments other than those described in the following, without departing from the scope of the present invention. For example, the above description of the different advantages of the present invention is primarily described in relation to a bearing unit for a wind turbine rotor arrangement, however, the various embodiments of the invention are of course also applicable when the fluid machinery application is a water turbine arrangement or a propulsion turbine arrangement.

BRIEF DESCRIPTION OF THE DRAWINGS

Embodiments of the invention will now be described, by way of example and with reference to the accompanying drawings, in which:

FIG. 2a is a schematic side view of an example embodiment of a fluid machinery application according to the present invention, in which the fluid machinery application is a wind turbine rotor shaft arrangement;

Figure 1:
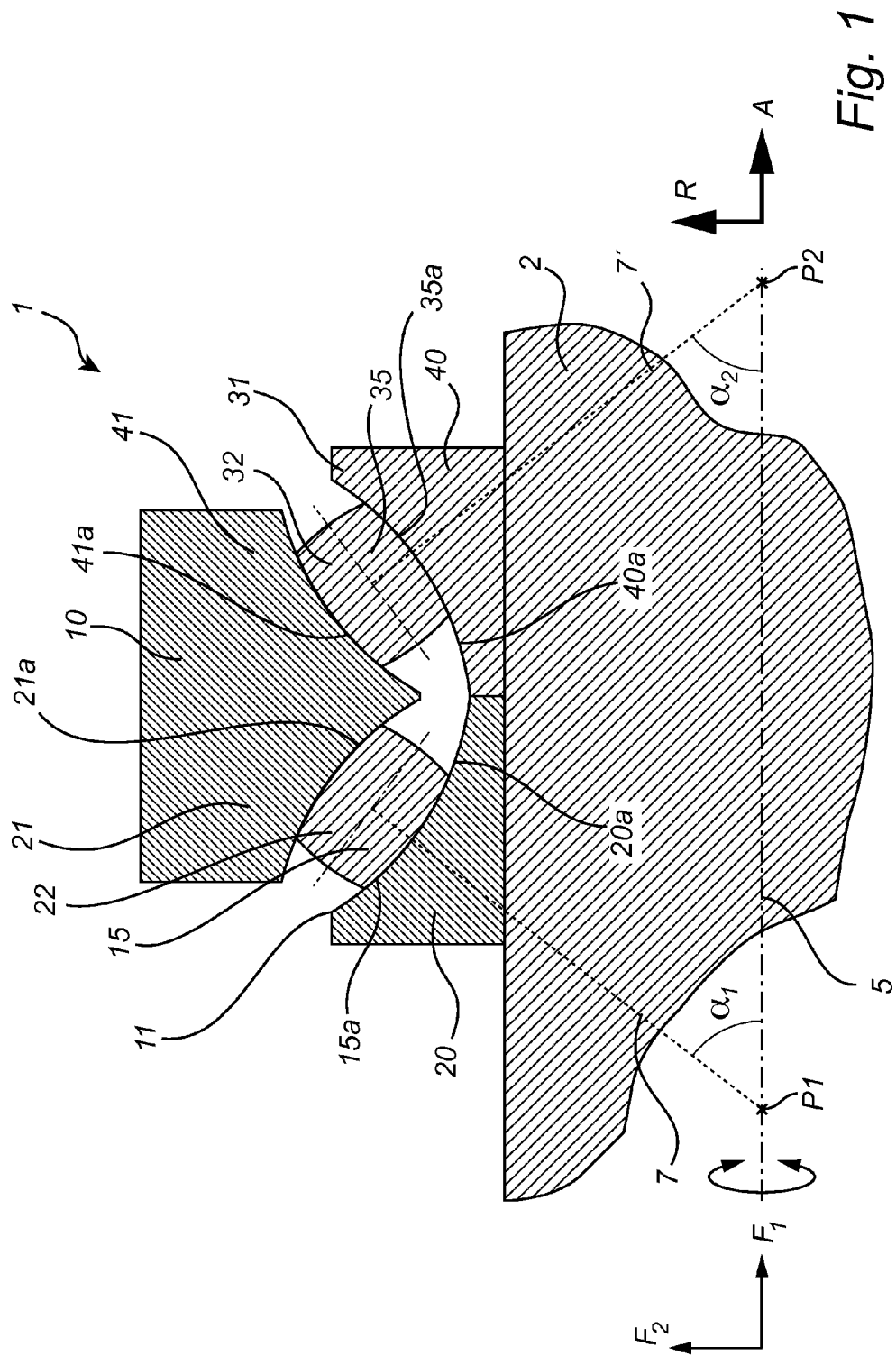
FIG. 1 is a schematic cross-sectional view of an example embodiment of a bearing unit for a fluid machinery application according to the present invention, wherein the bearing unit includes double-row bearing.

It should be understood that the drawings are not true to scale and, as is readily appreciated by a person skilled in the art, dimensions other than those illustrated in the drawings are equally possible within the scope of the invention. Moreover, it should be readily understood that some details in the drawings may be exaggerated in comparison with other details. Furthermore, some of the drawings have been simplified by removing some details relating to the rotational symmetry of the bearing unit.

DETAILED DESCRIPTION OF EXEMPLARY EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference characters refer to like elements throughout the description.

Referring now to the figures and FIG. 1 in particular, there is depicted a bearing unit for a fluid machinery application according to an example embodiment of the present invention.

Although the following description has been made on a wind turbine arrangement, the present invention may as well be implemented in a water turbine arrangement. In addition, the present invention may also be implemented in a propulsion turbine arrangement. As used herein, the term "fluid machinery application" therefore means any arrangement that can extract energy from a continuously moving stream of fluid (liquid or gas) and is suitable for supporting a radial force and a considerable large axial force, at least in one direction of the shaft of the fluid machinery application.

Figure 2B:
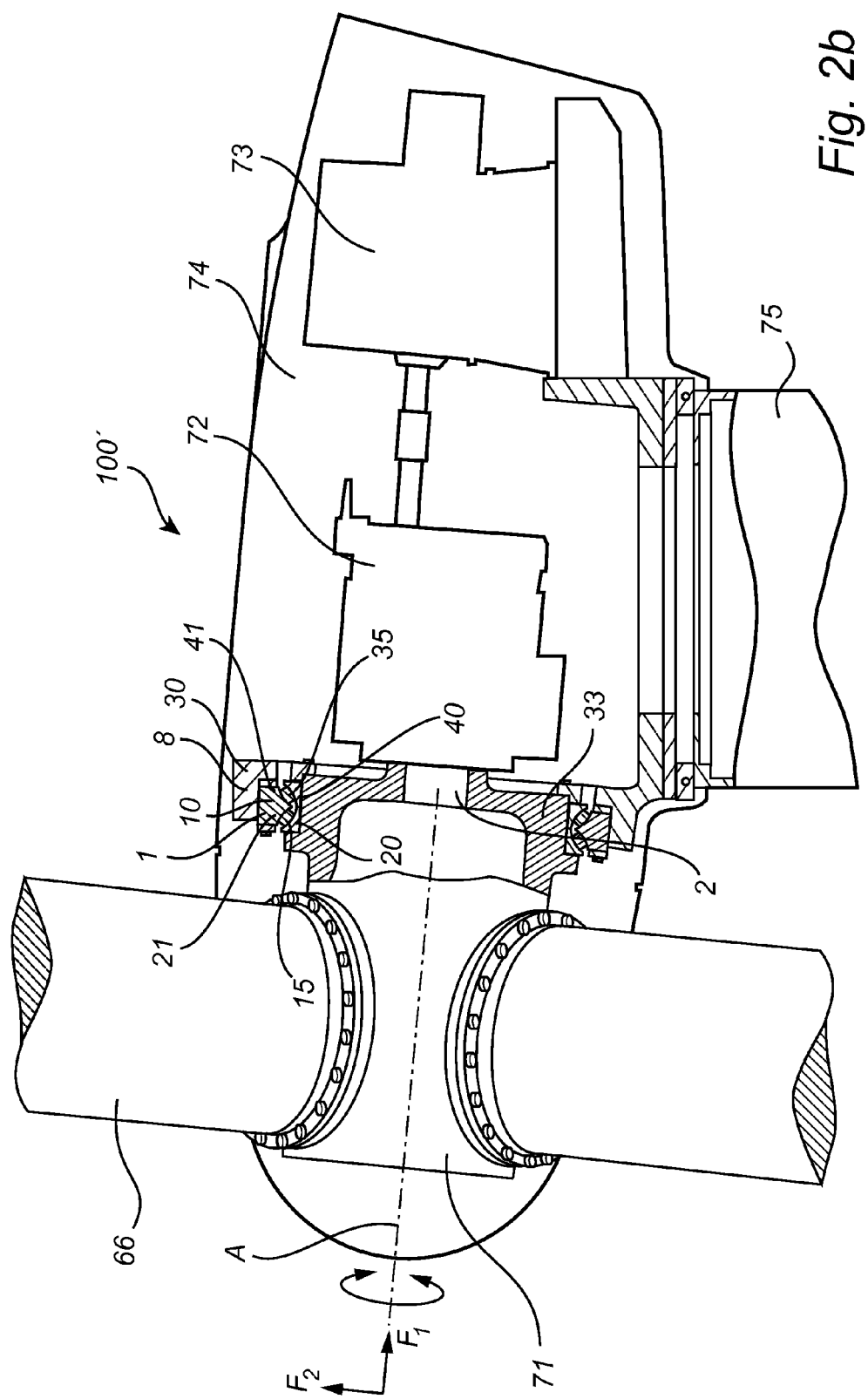
FIG. 2b is a schematic side view of another example embodiment of a fluid machinery application according to the present invention, in which the fluid machinery application is a wind turbine rotor shaft arrangement.

FIGS. 2a and 2b schematically illustrate the bearing unit arranged in a fluid machinery application in the form of a wind turbine arrangement 100, 100'. Due to the configuration of the bearing unit, as will be further described hereinafter, the bearing unit is capable of supporting an axial force $F_1$ and a radial force $F_2$ as well as overturning moments M1 and M2.

In FIG. 2a, there is depicted a wind turbine rotor shaft arrangement 100 comprising a rotor shaft 2 for supporting a set of wind turbine blades 66. The rotor shaft 2 here extends axially along a rotor axis A. The rotor shaft 2 is arranged to be rotatably mounted in a nacelle framing arranged in the top of a tower-like support structure of a wind turbine having a horizontal, or nearly horizontal, orientation of the rotor shaft. However, the wind turbine rotor shaft arrangement 100 is not limited to a horizontal type orientation, but may also be used in wind turbines applications having a tilted or a vertical type rotor shaft orientation. The orientation of the rotor shaft is defined in relation to its intended mounted operational position in a nacelle framing of an operational wind turbine.

The rotor shaft 2 here is operatively connected to a set of wind turbine blades 66 via a hub unit 71, whereby the rotor shaft is capable of supporting the rotational movement of the turbine blades 66.

As further illustrated in FIG. 2a, the rotor shaft 2 is supported to a wind turbine nacelle housing 74 by means of the bearing unit 1 at a support point 33.

By the arrangement of the bearing unit 1 in the wind turbine rotor shaft arrangement 100, the bearing unit 1 is capable of axially locate and secure the rotor shaft in relation to the housing structure and the nacelle framing.

More specifically, the wind turbine rotor shaft arrangement here is provided with a non-rotating housing structure 30 at the support point 33 for supporting the rotor shaft 2 in relation to the wind turbine nacelle framing 74. For example, the housing structure 30 can either be a part of the nacelle framing structure or a separate part, but integral part, of the nacelle framing structure.

The arrangement 100 is arranged in the wind turbine framing construction, or housing, 74, which is located in a tower-like support member 75.

In the example embodiment as shown in FIG. 2a, the rotor shaft 2 here is directly coupled to a generator 73 without shifting the rotational speed of the rotor shaft with a gear box. In this example embodiment, the generator 73 is arranged radially outside the bearing unit 1.

However, the bearing unit 1 may be arranged in several different ways. Hence, in another example embodiment, as illustrated in FIG. 2b, the rotor shaft 2 here is connected to a gear box 72 for shifting the rotational speed of the rotor shaft 2 before coupling the rotation of the rotor shaft 2 to a generator 73. Besides this difference in technical features of the wind turbine rotor shaft arrangements, the example embodiment as shown in FIG. 2b may include any one of the features and/or aspects mentioned with respect to example embodiment in FIG. 1 and FIG. 2a.

Although not shown in the Figures, the bearing unit 1 may be operatively secured to an attachment portion of the rotor shaft 2 by means of an expansion member to facilitate assembly of the bearing unit to the rotor shaft.

Moreover, depending on the design of the wind turbine rotor shaft, the bearing unit 1 may be arranged to have substantially no axial play, or be arranged with a suitable axial play that is split between the two contact bearings 11, 31, and which can range from negative (preload) via zero to positive.

Due to the rotational movement of the set wind turbine blades 66, the rotor shaft is subjected to an axial force $F_1$ and a radial force $F_2$, as seen in the axial direction A of the rotor shaft 2. By arranging a bearing unit 1 according to the present invention in the wind turbine rotor shaft arrangement 100, there is provided an improved and compact technical solution for effectively supporting the radial forces and axial forces of the shaft.

With particular reference to FIG. 1, the bearing unit 1 comprises a double-row bearing 10. The double-row bearing 10 comprises a first angular self-aligning contact bearing 11 arranged next to a second angular self-aligning contact bearing 31 for locating and rotatably support a shaft (2). That is, for locating the shaft against movement in an axial direction A and a radial direction R as well as against overturning movements of the shaft.

Typically, the bearing unit 1 is provided in the form of a single bearing unit (which is a different configuration compared to having two separate bearings located next to each other).

Typically, but not necessarily, the self-aligning first angular contact bearing 11 here is provided with a first inner ring 20 and a first outer ring 21. As is illustrated in FIG. 1, the first inner ring is a flangeless inner ring, i.e. the inner ring is free from a guiding flange.

As shown in FIG. 1, the outer ring 21 is positioned radially outside the inner ring 20.

It should be readily understood that the first inner ring 20 typically is movable in relation to the first outer ring 21 in the axial direction of the rotor shaft 2.

The first angular self-aligning contact bearing 11 further has a first set of rolling elements formed of rollers 15 arranged in a first row 22. By being arranged in a first row means that the first set of rollers 15 are circumferentially arranged around the rotor shaft 2 in a row.

Moreover, the first set of rollers 15 are interposed between a first curved inner raceway 20a of the first inner ring and a first curved outer raceway 21a of the first outer ring.

However, it should be readily appreciated that the first curved inner raceway 20a may alternatively be formed directly in a part of the shaft 2 and is therefore not necessarily always part of an inner ring.

As may be gleaned from FIG. 1, each roller 15 is a symmetrical cylindrically shaped roller having a curved raceway-contacting surface 15a being engageable (or in contact) with the first curved inner raceway 20a and the first curved outer raceway 21a.

Moreover, each roller 15 of the first angular self-aligning contact bearing 11 is inclined in relation to the axial direction of the shaft 2 by a first contact angle $\alpha_1$. Thus, each roller 15 is inclined in relation to the axial direction of the shaft 2 whereby a first contact angle $\alpha_1$ is formed as shown in FIG. 1. In other words, the first contact angle $\alpha_1$ is formed between each roller 15 and any of the first curved inner raceway 20a and the first curved outer raceway 21a such that each roller is inclined in relation to the axial direction of the shaft 2. As is illustrated in FIG. 1, the first contact angle $\alpha_1$ is defined as the angle between a straight line 7 normal to a centre axis of a roller 15 and the centre axis 5 of the rotor shaft 2 (i.e. a straight line parallel to the plane of rotation). The straight line 7 also represents the line along which the resulting load is transmitted via the roller element 15 from one raceway 21a to another raceway 20a. The straight line 7, i.e. the normal to the centre axis of the roller 15, is thus considered to represent the pressure line of the roller 15. As a consequence, a first pressure centre $P_1$ of the first angular self-aligning contact bearing 11 can be defined by the intersection between the normal 7 to the centre axis of a roller of the first set of rollers 15 and the centre axis of the rotor shaft 5.

The contact angle $\alpha_1$ of the first angular self-aligning contact bearing may also be defined as the angle between the rotational axis of the symmetrical rollers 15 and the centre axis 5 of the rotor shaft 2.

The value of the first contact angle $\alpha_1$ of the first angular self-aligning contact bearing should be appropriately selected. However, in order to provide a tilted or an inclined first angular self-aligning contact bearing, the angle cannot be equal to 0 degrees or 90 degrees, which is clearly understood from FIG. 1. As an example, the value of the first contact angle $\alpha_1$ may be between 10-60 degrees. The value of the first contact angle $\alpha_1$ in FIG. 1 is approximately 45 degrees.

Thus, the first angular self-aligning contact bearing 11 has a pronounced tilted contact angle. In this manner, the rollers 15 are arranged to cooperate with the curved inner raceway 20a and the curved outer raceway 21a for supporting an axial force $F_1$ and a radial force $F_2$. By this inclined configuration of the rollers 15, the axial movement of the shaft 2 in relation to the first angular self-aligning contact bearing 11 can be restricted. During operation of the rollers 15, the pronounced tilted contact angle contributes to an improved axial load bearing capacity of the first angular self-aligning contact bearing 11. As such, the first angular self-aligning contact bearing 11 is considered to be self-aligning.

Moreover, the configuration of the first angular self-aligning contact bearing 11 allows for reduced or minimal axial and radial width of the bearing unit. The angular self-aligning capacity of the first angular self-aligning contact bearing 11 is further advantageous over conventional bearing in that the inclined angular self-aligning contact bearing requires less manufacturing precision, while maintaining a simple mounting of the bearing unit in a fluid machinery application.

A bearing having a configuration corresponding to the configuration of the first angular self-aligning contact bearing may sometimes be denoted as a SAT (self-aligning torus) bearing. A SAT bearing may also be defined (or distinguished) by a distance X being larger than zero (x>0). The distance X is defined by the distance between the rotor shaft centre axis 5 and the normal to the centre axis of the roller 7.

Analogous to the configuration of the first angular self-aligning contact bearing, the second angular self-aligning contact bearing 31 is also a self-aligning bearing. In other words, the second angular self-aligning contact bearing 31 has a second set of rolling elements formed of rollers 35 arranged in a second row 32. By being arranged in a second row means that the second set of rollers 35 are circumferentially arranged around the rotor shaft 2 in a row. Typically, but not strictly necessarily, the second angular self-aligning contact bearing 31 here is provided with a second inner ring 40 and a second outer ring 41. As is illustrated in FIG. 1, the second inner ring is a flangeless inner ring, i.e. the second inner ring is free from a guiding flange.

As shown in FIG. 1, the outer ring 21 is positioned radially outside the inner ring 20.

As mentioned above, the first inner ring 20 typically is movable in relation to the first outer ring 21 in the axial direction. Analogously, the second inner ring 40 typically is movable in relation to the second outer ring 40 in the radial direction of the rotor shaft. Moreover, it should be readily understood that the first outer ring 21 typically is movable in relation to the second outer ring 41.

Moreover, the second set of rollers 35 are interposed between a second curved inner raceway 40a of the second inner ring 40 and a second curved outer raceway 41a of the second outer ring 41.

In this context of the present invention, it should be readily appreciated that the second curved inner raceway 40a may alternatively be formed directly in a part of the shaft 2. Hence, the second curved inner raceway 40a may not necessarily be a part of an inner ring.

As may be gleaned from FIG. 1, each roller 35 is a symmetrical cylindrically shaped roller having a curved raceway-contacting surface 35a being engageable (or in contact) with the second curved inner raceway 40a and the second curved outer raceway 41a.

In addition, each roller 35 of the second angular self-aligning contact bearing 31 is inclined in relation to the axial direction of the shaft 2 by a second contact angle $\alpha_2$. Thus, each roller 35 is inclined in relation to the axial direction of the shaft 2 whereby a second contact angle $\alpha_2$ is formed as shown in FIG. 1. In other words, the second contact angle $\alpha_2$ is formed between each roller 35 and any of the second curved inner raceway 40a and the second curved outer raceway 41a such that each roller 35 is inclined in relation to the axial direction of the shaft 2. The second contact angle $\alpha_2$ is defined as the angle between a straight line 7' normal to a centre axis of a roller 35 and the centre axis 5 of the rotor shaft 2 (i.e. a straight line parallel to the plane of rotation). The straight line 7' also represents the line along which the resulting load is transmitted via the roller element 35 from one raceway 41a to another raceway 40a. The straight line 7', i.e. the normal to the centre axis of the roller 35, is thus considered to represent the pressure line of the roller 35. As a consequence, a second pressure centre $P_2$ of the second angular self-aligning contact bearing 31 can be defined by the intersection between the normal 7' to the centre axis of a roller of the first set of rollers 35 and the centre axis of the rotor shaft 5.

The second contact angle $\alpha_2$ of the second angular self-aligning contact bearing may also be defined as the angle between the rotational axis of the symmetrical rollers 35 and the centre axis 5 of the rotor shaft 2. The value of the second contact angle $\alpha_2$ of the second angular self-aligning contact bearing should be appropriately selected. However, in order to provide a tilted or an inclined second angular self-aligning contact bearing, the angle cannot be equal to 0 degrees or 90 degrees, which is clearly understood from FIG. 1. As an example, the value of the second contact angle $\alpha_2$ may be between 10-60 degrees. The value of the second contact angle $\alpha_2$ in FIG. 1 is approximately 45 degrees.

Thus, the second angular self-aligning contact bearing 31 has a pronounced tilted contact angle. In this manner, the rollers 35 are arranged to cooperate with the curved inner raceway 40a and the curved outer raceway 41a for supporting an axial force $F_1$ and a radial force $F_2$. By this inclined configuration of the rollers 35, the axial movement of the shaft 2 in relation to the second angular self-aligning contact bearing 31 can be restricted. During operation of the rollers 35, the pronounced tiled contact angle contributes to an improved axial load bearing capacity of the second angular self-aligning contact bearing 31. As such, the second angular self-aligning contact bearing 31 is considered to be self-aligning.

Moreover, the configuration of the second angular self-aligning contact bearing 31 allows for reduced or minimal axial and radial width of the bearing unit. The angular self-aligning capacity of the second angular self-aligning contact bearing 31 is further advantageous over conventional bearings in that the inclined angular self-aligning contact bearing requires less manufacturing precision, while maintaining a simple mounting of the bearing in a fluid machinery application.

As is further illustrated in FIG. 1, each roller 15 of the first angular self-aligning contact bearing 11 is inclined in relation to each roller 35 of the second angular self-aligning contact bearing 31. In this manner, the first pressure centre $P_1$ of the first angular self-aligning contact bearing 11 is displaced from the second pressure centre $P_2$ of the second angular self-aligning contact bearing 31. In other words, there is no intersection between the normal 7 to the centre axis of a roller of the first set of rollers (first pressure line) and the normal 7' to the centre axis of a roller of the second set of rollers (second pressure line) along the centre axis of the rotor shaft 5. One major technical effect of this configuration is that a large axial distance between the two pressure centers 7 and 7' allows the double-row bearing to carry an overturning moment.

In one example embodiment (although not shown), the value of the first contact angle $\alpha_1$ may be distinct from the value of the second contact angle $\alpha_2$. In this manner, the bearing unit may be provided with asymmetric rows, i.e. the inclination of the first row of the first set of rollers is different to the inclination of the second row of the second set of rollers. One advantage with this configuration is that size of the bearing unit can be adjusted to meet the demands of a certain wind turbine arrangement. In other words, the size of the bearing unit can kept to a minimum.

Turning again to the example embodiment as shown in FIG. 1, and as mentioned above, the first curved inner raceway 20a may be arranged in a first inner ring 20 of the first angular self-aligning contact bearing 11. Analogously, the first curved outer raceway 21a may be arranged in a first outer ring 21 of the first angular self-aligning contact bearing 11. In this manner, the outer ring 21 encircles the inner ring 20, whereby the set of rolling elements formed of the rollers 15 is arranged in an intermediate configuration between the first inner ring 20 and the first outer ring 21. Moreover, the second curved inner raceway 40a may be arranged in a second inner ring 40 of the second angular self-aligning contact bearing 31. Analogously, the second curved outer raceway 41a may be arranged in a second outer ring 41 of the second angular self-aligning contact bearing 31. In this manner, the second outer ring 41 encircles the second inner ring 40, whereby the set of rolling elements formed of the rollers 35 is arranged in an intermediate configuration between the second inner ring 40 and the second outer ring 41.

In another example embodiment (not shown), the first curved outer raceway 21a and the second curved outer raceway 41a may be arranged in the same outer ring. Hence, the double-row bearing can be provided with a single outer ring having two curved outer raceways, one raceway for the first set of rollers 15 and a second raceway for the second set of rollers 35. In this context of the present invention, the first angular self-aligning contact bearing 11 and the second angular self-aligning contact bearing 31 are configured to share the outer ring.

Furthermore, each side of the bearing unit 1 may further be sealed off by means of a seal (not shown). The seal can be provided in the form of a one-piece homogeneous component, typically made from a material that is softer as compared to the material or the bearing rings. Such material can be rubber or any suitable type of plastic material. This means that the production costs can be kept low in comparison to conventional bearing seals, which are often composed of components of different material (rubber and metallic reinforcements).

In the context of the present invention, the first angular contact self-aligning bearing and the second angular self-aligning contact bearing here is provided with a clearance which is split between the two angular contact bearings.

In the illustrated example embodiment, the curved outer raceway 21a of the first angular self-aligning contact bearing 11 and the curved outer raceway 41a of the second angular self-aligning contact bearing 31 are facing away from each other, as seen in the axial direction A. In other words, the pair of the first angular self-aligning contact bearing 11 and the second angular self-aligning contact bearing 31 is mounted in a so-called back-to-back arrangement, also sometimes denoted O-arrangement.

However, it should be readily understood that the curved outer raceway 21a of the first angular self-aligning contact bearing 11 may facing the curved outer raceway 41a of the second angular self-aligning contact bearing 31, as seen in the axial direction A. This is sometimes denoted a so-called face-to-face arrangement, or X-arrangement.

In the illustrated example embodiment in FIG. 2a or 2b, the first angular self-aligning contact bearing 11 and the second angular self-aligning contact bearing 31 here are further contained in a bearing housing 8. The bearing housing 8 is integrally formed in a housing structure unit arranged to be mounted in the nacelle framing.

Thanks to the bearing unit of the present invention, there is provided a bearing unit having an optimized internal geometry, while conferring maximum radial and axial load carrying capacity. The present invention is further robust in the sense that the bearing unit is less sensitive to misalignment caused by shaft or housing deflections as a result of heavy loads. Since the first angular self-aligning contact bearing and the second angular self-aligning contact bearing are non-separable (arranged next to each other) and ready to be installed in a fluid machinery application, the mounting of the bearing unit is simplified, enabling a more efficient and compact fluid machine designs.

In particular, the self-aligning capacity of bearing unit is optimized. Thereby, it becomes possible to support axial and radial loads in a simple yet effectual and reliable manner. The bearing unit of the present invention is thereby configured for allowing angular local misalignments, such as wringing or twisting of the rings.

In another example embodiment, the present invention may have two rows of rollers sharing a common outer race provided with a common concave spherical raceway, while the inner race is provided with two concave spherical raceways that form an angle with the bearing axis. The curvature centre of the outer raceway is consistent with the bearing centre. The self-aligning roller bearing is self-adjusted, and it is not affected by non-centering or shaft deformation flexure of shaft and bearing block, so it can compensate the concentricity error caused by these reasons. Except being subject to radial load, this type of bearing can also be subject to bidirectional axial load and their combination load. The load capacity is large, and the bearing unit is provided with preferable shock resistant capacity.

Although the invention has been described in relation to specific combinations of specific rotor arrangements, it should be readily appreciated that a use of the bearing unit may be combined in other fluid machinery applications as well which is clear for the skilled person when studying the present application. Thus, the above description of the example embodiment of the present invention and the accompanying drawings are to be regarded as a non-limiting example of the invention and the scope of protection is defined by the appended claims. Any reference sign in the claims should not be construed as limiting the scope.

REFERENCE NUMERALS 1 bearing unit
2 rotor shaft
5 rotor shaft centre axis
7, 7' normal to centre axis of first roller, second roller—pressure line first, second
8 bearing housing
10 double-row bearing
11 first angular self-aligning contact bearing
15 first set of rolling elements formed of the rollers
15a curved race-way contacting surface
20 first inner ring
20a first curved inner raceway
21 first outer ring
21a first curved outer raceway
22 first row of rollers
30 non-rotating housing structure
31 second angular self-aligning contact bearing
32 second row of rollers
33 support point
35 second set of rolling elements formed of the rollers
35a curved race-way contacting surface
40 second inner ring
40a second curved inner raceway
41 second outer ring
41a second curved outer raceway
66 wind turbine blades
71 hub unit
72 gear box
73 generator
74 nacelle housing
75 tower-like support structure
100 fluid machinery application—e.g. wind turbine rotor shaft arrangement
$\alpha_1$ first contact angle
$\alpha_2$ second contact angle
A axial direction
$F_1$ axial force
$F_2$ radial force
$P_1$ first pressure centre
$P_2$ second pressure centre

The invention claimed is:

1. A bearing unit for a fluid machinery application having a double-row bearing, the double-row bearing comprising:
a first angular self-aligning contact bearing arranged next to a second angular self-aligning contact bearing for locating and rotatably support a shaft;
the first angular self-aligning contact bearing having a first set of rolling elements formed of a first plurality of rollers arranged in a first row and interposed between a first curved inner raceway and a first curved outer raceway, wherein each of the first plurality of rollers is elongated and has a first curved raceway-contacting surface being engageable with the first curved inner raceway and the first curved outer raceway, and wherein each of the first plurality of rollers of the first angular self-aligning contact bearing is inclined in relation to the axial direction of the shaft by a first contact angle;

whereby the first plurality of rollers are arranged to cooperate with the first curved inner raceway and the first curved outer raceway for supporting an axial force and a radial force;

the second angular self-aligning contact bearing having a second set of rolling elements formed of a second plurality of rollers arranged in a second row and interposed between a second curved inner raceway and a second curved outer raceway, wherein each of the second plurality of rollers is elongated and has a second curved raceway-contacting surface being engageable with the second curved inner raceway and the second curved outer raceway, and wherein each of the second plurality of rollers of the second angular self-aligning contact bearing is inclined in relation to the axial direction of the shaft by a second contact angle;

whereby the second plurality of rollers are arranged to cooperate with the second curved inner raceway and the second curved outer raceway for supporting the axial force and the radial force;

wherein each of the first plurality of rollers of the first angular self-aligning contact bearing is inclined in relation to each of the second plurality of rollers of the second angular self-aligning contact bearing such that a first pressure centre of the first angular self-aligning contact bearing is displaced from a second pressure centre of the second angular self-aligning contact bearing, wherein a single ring forms one of: (1) the first and second curved inner raceways, and (2) the first and second curved outer raceways, and another one of: (1) the first and second curved inner raceways, and (2) the first and second curved outer raceways which is not formed by the single ring provides opposing raceway surfaces to the single ring, wherein the single ring is movable with respect to the opposing raceway surfaces during operation such that the opposing raceway surfaces can move axially relative to the single ring, the single ring is also moveable with respect to the opposing raceway surfaces during operation such that the opposing raceway surfaces can be angularly displaced with respect to the single ring and a rotation axis of the bearing unit.

2. The bearing unit according to claim 1, wherein the bearing unit is a single bearing unit.

3. The bearing unit according to claim 1, wherein the first curved inner raceway is at least one of:
   (a) arranged in a first inner ring of the first angular self-aligning contact bearing, and
   (b) arranged in a first outer ring of the first angular self-aligning contact bearing.

4. The bearing unit according to claim 1, wherein the second curved inner raceway is at least one of:
   (a) arranged in a second inner ring of the second angular self-aligning contact bearing, and
   (b) arranged in a second outer ring of the second angular self-aligning contact bearing.

5. The bearing unit according to claim 1, wherein the first curved inner raceway is arranged in a first inner ring and the second curved inner raceway is arranged in a second inner ring, while the first curved outer raceway and the second curved outer raceway is arranged in one single outer ring.

6. The bearing unit according to claim 1, wherein the first curved outer raceway is arranged in a first outer ring and the second curved outer raceway is arranged in a second outer ring, while the first curved inner raceway and the second curved inner raceway is arranged in one single inner ring.

7. The bearing unit according to claim 1, wherein the first curved outer raceway of the first angular self-aligning contact bearing and the second curved outer raceway of the second angular self-aligning contact bearing are facing away from each other, as seen in the axial direction.

8. The bearing unit according to claim 1, wherein the first curved outer raceway of the first angular self-aligning contact bearing is facing the second curved outer raceway of the second angular self-aligning contact bearing, as seen in the axial direction.

9. The bearing unit according to claim 1, wherein the first angular self-aligning contact bearing and the second angular self-aligning contact bearing are contained in a bearing housing.

10. An apparatus comprising: a fluid machinery application incorporating the bearing unit of claim 1.

11. The apparatus according to claim 10, wherein the fluid machinery application is one of: a wind turbine arrangement, a water turbine arrangement, or a propulsion turbine arrangement.

12. The apparatus according to claim 10, wherein the bearing unit is arranged for supporting radial forces and axial forces of the shaft.

13. The apparatus according to claim 12, wherein the shaft is a rotor shaft, the rotor shaft is operatively connected to turbine blades, whereby the rotor shaft is capable of supporting the rotational movement of the turbine blades.

14. The apparatus according to claim 13, further comprising a generator arranged radially outside the bearing unit.

15. An apparatus, comprising a fluid machine application having a shaft and including the bearing unit of claim 1, wherein the bearing unit is installed on a shaft and configured to support axial forces of the shaft in the fluid machinery application.

* * * * *